E. W. COOKE.
PROCESS OF DEHYDRATING ANIMAL AND VEGETABLE SUBSTANCES.
APPLICATION FILED JAN. 30, 1905.
1,025,374.
Patented May 7, 1912.
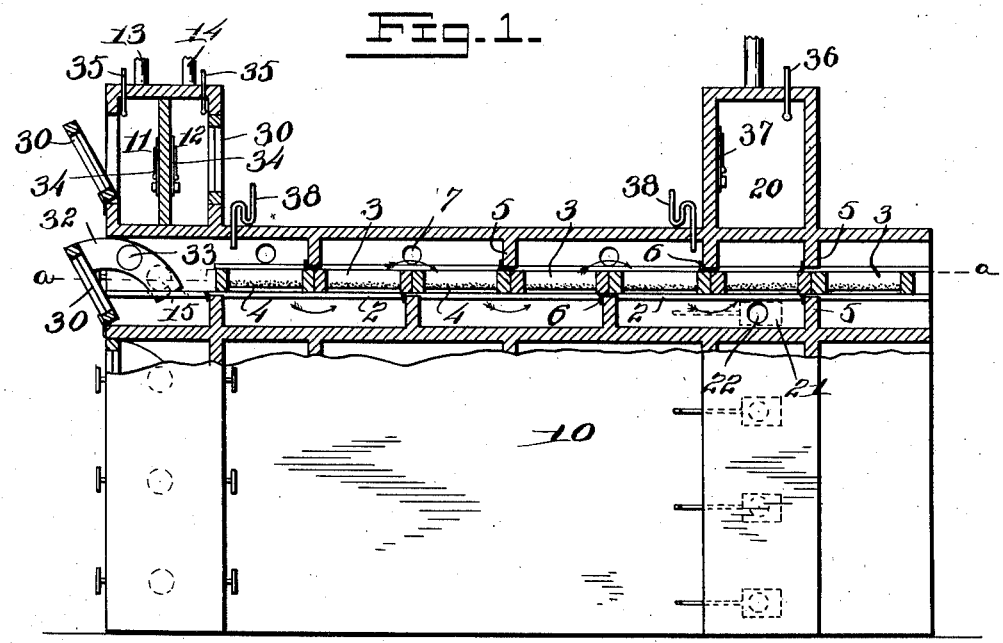
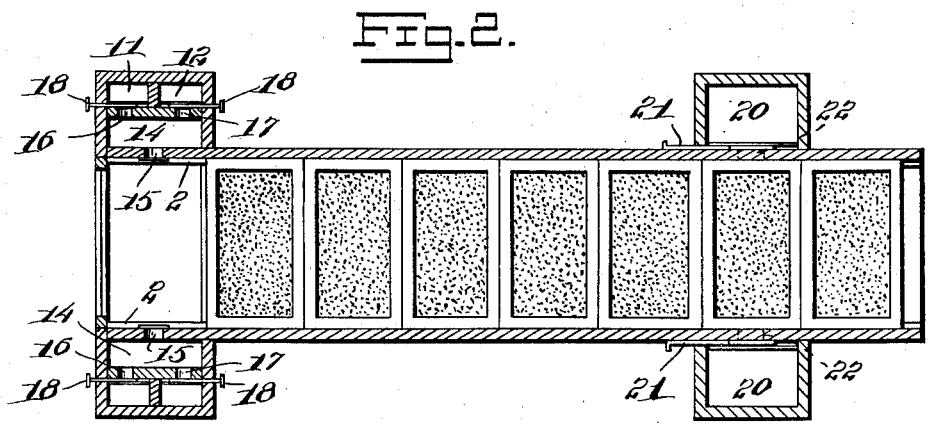

UNITED STATES PATENT OFFICE.

ERNEST WILLIAM COOKE, OF NEW YORK, N. Y., ASSIGNOR, BY MESNE ASSIGNMENTS, TO THE COKEL COMPANY, A CORPORATION OF NEW JERSEY.

PROCESS OF DEHYDRATING ANIMAL AND VEGETABLE SUBSTANCES.

1,025,374.     Specification of Letters Patent.     Patented May 7, 1912.

Application filed January 30, 1905. Serial No. 243,304.

*To all whom it may concern:*

Be it known that I, ERNEST W. COOKE, a citizen of the United States, residing at New York, in the county of New York and State of New York, have invented certain new and useful Improvements in the Process of Dehydrating Animal and Vegetable Substances; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention consists in a process of dehydrating succulent animal and vegetable food substances by means of which I have obtained results which I believe to have never been before obtained, in that I am enabled, by the operation of my process, to remove all, or the larger part of the water contained in the material treated without injuring the texture or cellular structure of the animal or vegetable products, however delicate it may be.

The materials treated by my process can be perfectly restored to their original, undehydrated condition by the simple addition and absorption of water, either hot or cold.

My process is more particularly applicable to the dehydration of succulent food substances, which are thereby greatly reduced in weight and bulk, thus immensely facilitating their transportation and storage, and are thereafter available at any time for restoration to edible condition by the simple addition of water, which restores them so perfectly that they cannot be distinguished from the fresh products.

It is well known that it is practically impossible to obtain fresh vegetables, fruit, etc., at all seasons, even in tropical climates, and indeed in many parts of the earth, it is practically impossible to obtain such at any time. The absence of fresh food substances is often not only a hardship, but is the cause of serious suffering and sickness. The practice of my invention therefore will be of the greatest benefit to large numbers of the human race, permitting as it does, the easy transportation and storage, and the keeping for an unlimited time, of all varieties of dehydrated vegetables, as well as fruit and animal food substances, which require nothing but water to restore them absolutely to the condition of freshness in which they were when originally treated by my process.

My invention must not be confused with methods heretofore employed for preserving vegetables, etc., in which preservatives are invariably used, to the best of my knowledge and belief, or of the ordinary methods of desiccating food substances, the results of which, as is well known, cause a change in the composition or structure of the material, preventing its restoration to a fresh condition.

The essential features of my process are: 1st. A suitable preliminary preparation of the material, which consists, when the material is too large to be readily dehydrated by my process in its original size, in dividing it more or less finely, and in some instances, in subjecting it to a preliminary slight cooking process. 2d. In subjecting the material in masses of suitable size to the action of a current of air or equivalent gas in such a way as to give an equalized removal of the water without injuring the cellular structure of the material, or cooking or otherwise chemically changing its composition in any other way than by removing the water which is present, so to speak, mechanically, as moisture. The temperature of the air must in any event not be high enough to give any chemical change in the succulent food material treated, as by breaking down compounds in which water exists in a state of combination; or be high enough to do more than merely remove moisture. Incidentally in some instances there may be a slight loss of other ingredients, a loss too small to materially affect the product.

I have discovered by repeated experiments that, in order to obtain the desired results, the dehydration must be performed by a current of air or other suitable gas, the initial temperature of which depends upon the kind of material being treated, this current being caused to thoroughly permeate the material by being forced to pass back and forth in alternating direction through successive portions of the same, the entering undehydrated material first encountering air which has already passed through previous portions of the same or other material, and which is therefore already charged with moisture, and, if initially heated, has become more or less cooled. As the material progresses, it therefore encounters air which is more and more dry and of increasing or decreasing temperature until finally it comes in contact with air of the initial dryness and temperature which, as I have said, must be varied to suit the kind of material being treated. In this method of operation the amount of evaporation in a time unit is equalized, preventing sudden changes of composition.

I am aware that broadly considered the process just described, of subjecting the material first to the action of air which has already absorbed moisture from the preceding material and gradually progressing the material until it comes in contact with air which has not as yet come in contact with any of the material, has been known hitherto, and that it has been used, or proposed to be used, for the drying of pottery, grain, cement, etc. In no case, of which I am aware, however, has such a process been used for the dehydrating of vegetables and other food products, for which purpose a much more gradual action is required so as not to injuriously affect the delicate structure of such substances, it being as stated, necessary to withdraw the water without affecting in any material way the remaining solid substance. The dehydrated foods obtained by the present process are desiccated in such a manner as to lose only what is, so to speak, the water mechanically present without losing water chemically present as water of constitution or the volatile oily bodies which give the aroma and taste to ordinary foods, and such dehydrated foods therefore on rehydration by treatment with water reassume the condition of the original material. The results which I obtain by my process depend upon an additional feature, which I believe to be absolutely new in this art, and which I will now describe.

I have stated that the operation of dehydrating vegetable and animal food products must be conducted in a much more gradual manner than the drying of pottery, etc., but it is not only necessary that the dryness and temperature of the air should be gradually varied from the time the operation commences upon any given portion of material until it is completed thereupon in such manner as to equalize to some degree the amount of moisture evaporated in each stage of the drying, but I have determined that it is also necessary—and this I regard as an essential feature of my invention—to retard the flow of the air as it leaves the apparatus in which the material is treated in such manner as to "back it up" as it were in the apparatus, thereby maintaining the air under a certain degree of pressure while still permitting the flow of the flowing current of air, the amount of which varies with different materials, while at the same time permitting a gradual constant flow of air through the apparatus whereby the substances being treated are constantly acted upon by fresh air, which, being under pressure is forced to thoroughly permeate the pores and cells of the substances, and prevents the crushing or rupturing of the cell walls as the dehydration progresses. There must be a flowing current of air but this air must be under some pressure. It is this action, I believe, which maintains the substantial composition of the materials unchanged and enables them to be restored by water to their original freshness. The result of retarding the egress of the air so as to set up a certain pressure may be compared to that caused by placing a partial obstruction in a swiftly running stream. The water, retarded in its flow, rises and spreads, filling all the interstices and hollows among the rocks and in the banks, which previously were entirely passed by or only partially filled by the fast-running water. This produces an even evaporative effect, greatly aiding in the even evaporation of the moisture in each individual particle; and in order to produce products of the character contemplated in the present invention, an even and progressive evaporative effect is necessary from first to last. But this is difficult to secure without special precautions since air in going through a permeable or pervious mass of matter is prone to flow mainly through particular channels. The reversal of the direction of flow of the air from time to time greatly aids in securing even evaporation since thereby opposite sides of any given granule or particle alternately become, so to speak, windward and leeward sides. With the air always going one way, one side of each particle is always a leeward surface and it is not exposed to the dehydrating effects of the air to the same extent as where the direction of the air is occasionally reversed.

The apparatus I employ in carrying out my process may be of the type shown in my copending application for patent, filed January 29, 1904, Serial No. 191558 (Patent 867,246, Oct. 1, 1907), but it will be readily understood that the process may be carried out in different forms of apparatus, it being only essential that the subjection of the material to the action of the dry air be gradual, and that the egress of the air from the apparatus be retarded so as to cause the air to thoroughly permeate the substances and prevent any material change therein, other than the withdrawal of the water.

As an illustration of a form of apparatus which may be employed in the carrying out of my process, I will refer to the accompanying drawing, in which—

Figure 1 is a partial longitudinal, vertical section through a form of apparatus suitable for carrying out my process. Fig. 2 is a horizontal section thereof on the line $a$—$a$ of Fig. 1.

In said figures 3, 3 represent the trays upon the perforated bottoms 4 of which layers of the material to be treated are placed, such material when necessary being in a finely divided condition. These trays are movably supported on guide-ways 2, located on the side-walls of the dehydrating chamber which is indicated as a whole by 10. The trays may slide on these guide-ways, as shown, or be mounted on wheels or rollers, as desired, and there may be guides above as well as below the trays, if desired.

The chamber 10 comprises a series of superimposed tray compartments, a description of one of which will suffice. The trays are inserted at one end of the compartment, the right hand end in Fig. 1, while the current of air enters the left hand end of the compartment. The compartment is provided with partitions 5, extending alternately from the roof and floor thereof to said guideway 2, or into close proximity to the top and bottom of the trays. The free ends of these partitions are provided with flexible packing strips 6 which coact with the ends of the trays to form a practically air-tight joint. The distance between two adjacent partitions on the same side of the tray must be an exact multiple of the length of one tray, that is, it must be equal to the length of two or more trays, preferably to the length of two, as shown in the drawing. The trays are intermittently fed forward the length of one tray by pushing the last tray, either manually or by suitable mechanism, in until its rear end is in line with the end partitions 5, 5, which are arranged opposite each other, as shown, so as to prevent the egress of air. The other end of the compartment is provided with a glazed door 30, for the removal of the trays carrying the dehydrated material, and said door may conveniently be provided with a pair of cut-offs 32, one on each side, each having an aperture 33, which coincide, when the door is shut, with the passages 15, through which the dry air enters the compartment. Thus, when the door is opened for the purpose of removing a tray, for example, said cut-offs close said passages and shut off the air. Said passages 15 communicate with air-mixing boxes 14, which in turn communicate by passages 16 and 17 with air-ducts 11 and 12, into which may be respectively cold and hot air forced by a suitable blower (not shown) through pipes 13 and 14 leading from any suitable apparatus for drying, heating or cooling the air. The passages 16 and 17 are provided with cut-off valves 18, 18, whereby the qualities and quantities of the air, as well as the temperature of the mixed current, admitted into the mixing-boxes 14 may be controlled at will. The ducts 11 and 12 are also provided with glazed doors 30, through which hygrometers 34 may be read, and the humidity of the air determined.

Peep-holes 7, normally closed by plugs, are provided in the side-walls of the chamber 10, through which the material being treated may be inspected at any time. At the other end of the chamber 10 is located the air-egress chamber 20, communicating by passages 22 with each compartment thereof, valves 21 being provided to control said passages. In this way the pressure in each compartment may be regulated, pressure gages 38 being provided to indicate the same. The air egress chamber 20 is also provided with a hygrometer 37 to indicate the humidity of the air leaving the chamber, and thermometers 35 and 36 are located as shown to determine the temperatures of the air at the points indicated.

With this apparatus it will be obvious that as the trays are moved forward the direction of the air flow through each tray is reversed from time to time. The arrangement of partitions shown gives a very convenient way of securing this reversal since the air is caused to flow in a sinuous path through the drying chamber as a whole, alternately passing upward through a tray and downward through the next tray, with a positive flow through each such tray. This arrangement has the advantage of not requiring special means to reverse the flow of air from the air-supplying means from time to time. The successive trays filled with appropriate suitable permeable masses of succulent food material pass forward in a straight line, the air is introduced at one end and emerges at the other; but the advantages of alternate flow are automatically obtained and automatically as each tray passes forward the leeward sides of the objects constituting the permeable mass of succulent food material in it become windward sides and vice versa. The tray sides and partitions being imperforate and each tray relatively small, the feed of air through the masses of succulent food material is positive; the same portion of air being forced to pass through the material of each successive tray in the series.

Having thus described my invention, and a form of apparatus which may be used to practise the same, what I claim and desire to secure by Letters Patent of the United States is:

1. The process of dehydrating succulent food substances without injuring their cell structure or texture, which consists in subjecting pervious masses of such substances to the dehydrating action of a flowing current of air in moisture absorbing condition passed through such masses in a chamber maintained under pressure, said air being at a temperature too low to produce chemical changes in said succulent food substances and the air initially used in treating said substances containing some moisture, whereby the water is removed from them with substantially no loss of other substances and they are left in a condition such that they can be restored to their original undehydrated condition simply by the addition of water.

2. The process of dehydrating succulent food substances without injuring their cell structure, which consists in forcing a flowing current of air in moisture absorbing condition and of a temperature insufficient to produce chemical change in succulent food materials through permeable masses of such material in a suitable chamber and retarding the flow of the air from said chamber so as to maintain the air in said chamber under pressure, whereby the water is removed from the material with substantially no loss of other substances and the material is left in a condition such that it can be restored to its original undehydrated condition simply by the addition of water.

3. The process of dehydrating succulent food substances without injuring their cell structure, which consists in dividing the material into small pieces, and subjecting layers of the divided material to the dehydrating action of a flowing current of air passed therethrough in a chamber maintained under pressure, said air being in moisture absorbing condition and at a temperature too low to produce cooking or other chemical changes in succulent food materials, whereby the water is removed from the material with substantially no loss of other substances and the material is left in a condition such that it can be restored to its original undehydrated condition simply by the addition of water.

4. The process of dehydrating succulent food substances without injuring their cell structure, which consists in slightly cooking the food substance, dividing it into small pieces, and then subjecting layers of the divided material in a chamber maintained under pressure to the dehydrating action of a current of air passed therethrough and at a temperature too low to produce any further cooking or other chemical changes in said succulent food materials, whereby the water is removed from the material with substantially no loss of other substances and the material is left in a condition such that it can be restored to its original undehydrated condition simply by the addition of water.

5. The process of dehydrating succulent food substances without injuring their cell structure, which consists in subjecting permeable masses of the material to be dehydrated in a chamber maintained under pressure to the dehydrating action of a flowing current of air passed therethrough and containing some moisture, and then subjecting the partially dried material in said chamber to a flowing current of air containing less moisture than the air used at the beginning of the treatment, said current of air being in such condition as to produce no change in the composition of said succulent food materials other than the removal of water, whereby the water is removed from the material with substantially no loss of other substances and it is left in a condition such that it can be restored to its original undehydrated condition simply by the addition of water.

6. The process of dehydrating succulent food substances without injuring their cell structure, which consists in subjecting permeable masses of the material to be dehydrated in a chamber maintained under pressure to the dehydrating action of a flowing current of air passed therethrough and containing some moisture and in then subjecting the partially dried material while still under pressure to the action of a flowing current of air at a higher temperature and containing less moisture than the air used at the beginning of the treatment, whereby water is removed from the material with substantially no loss of other substances and such material is left in a condition such that it can be restored to its original undehydrated condition simply by the addition of water.

7. The process of dehydrating succulent food materials which comprises placing a permeable mass of such material in a suitable holder and subjecting the mass while in a chamber maintained under pressure to the passage of a flowing current of air until the desired degree of dehydration is completed, the passage of said current of air therethrough being reversed in direction at short intervals and the air initially passed through the fresh material carrying greater amounts of moisture than that subsequently used on the partially dried material and being at a temperature too low to produce cooking or other chemical changes in said succulent food materials.

8. The process of dehydrating succulent food materials which comprises treating a permeable mass of such a material maintained in a chamber under pressure by a flowing current of air passed through such mass until the desired degree of dehydration is effected, the amount of moisture in said air being proportional to the amount of moisture in such material at each stage during the drying operation and the air being in such condition as to produce no change in the composition of said succulent food materials.

9. In the dehydration of succulent food materials, the process which comprises passing a current of a gaseous dehydrating agent through a permeable mass of such a material, the direction of passage of said current through said mass being reversed from time to time at short intervals to cause opposite sides of said mass to become alternately leeward and windward sides.

10. In the dehydration of succulent food materials, the process which comprises passing a current of air through a permeable mass of such a material, the direction of passage of said current through said mass being reversed from time to time at short intervals to cause opposite sides of said mass to become alternately leeward and windward sides.

11. In the dehydration of succulent food materials, the process which comprises establishing a continuously flowing current of air, and transmitting a continuous succession of permeable layers of such a material across the path of said current in such manner that said current enters each successive layer at a different face.

12. In the dehydration of succulent food materials, the process which comprises establishing a current of air continuously flowing in a sinuous line in a given direction and passing a succession of permeable layers of such a material in the opposite direction in such a manner that said current passes through each successive layer in a different direction.

13. In the dehydration of succulent vegetable materials, the process which comprises passing a current of air through a permeable mass of such a material in a suitable chamber maintained under pressure, the direction of passage of said current through said mass being reversed from time to time to cause opposite sides of said mass to become alternately leeward and windward sides.

14. In the dehydration of succulent vegetable materials, the process which comprises passing a succession of trays containing permeable layers of such a material through a comparatively long tunnel-like chamber, and passing a current of air through said tunnel-like chamber in the opposed direction and causing such air current to travel in a sinuous path through said chamber, entering and passing through successive trays in different directions.

In testimony whereof, I affix my signature, in presence of two witnesses.

ERNEST WILLIAM COOKE.

Witnesses:
   GEO. W. JAMES,
   JOHN S. POTTER.